United States Patent
Sung et al.

(10) Patent No.: US 11,733,651 B2
(45) Date of Patent: Aug. 22, 2023

(54) HOLOGRAPHIC DISPLAY APPARATUS AND OPERATING METHOD THEREOF

(71) Applicant: SAMSUNG ELECTRONICS CO., LTD., Suwon-si (KR)

(72) Inventors: Geeyoung Sung, Daegu (KR); Daeho Yang, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 17/172,196

(22) Filed: Feb. 10, 2021

(65) Prior Publication Data

US 2022/0066391 A1    Mar. 3, 2022

(30) Foreign Application Priority Data

Aug. 28, 2020 (KR) .................. 10-2020-0109566

(51) Int. Cl.
*G03H 1/22* (2006.01)
*G02B 27/01* (2006.01)
*G03H 1/08* (2006.01)

(52) U.S. Cl.
CPC ....... *G03H 1/2294* (2013.01); *G02B 27/0172* (2013.01); *G03H 1/0808* (2013.01);
(Continued)

(58) Field of Classification Search
CPC ......... G03H 2001/0088; G03H 1/0443; G03H 1/08; G03H 1/268; G03H 2001/2675; G03H 2225/33; G03H 1/2294; G03H 1/0808; G03H 2001/0825; G03H 2210/30; G03H 1/2202; G03H 2001/2281; G03H 2210/20; G03H 1/2249; G03H 2001/2239; G03H 2001/2284; G03H 2210/44; G03H 2210/441; G03H 2210/454; G03H 1/12; G03H 1/0005; G03H 1/02; G03H 1/22; G02B 27/0172; G02B 2027/0174; G02B 2027/0178
(Continued)

(56) References Cited

U.S. PATENT DOCUMENTS 10,008,004 B1    6/2018 Duan et al.
10,884,240 B2 *  1/2021 Song .................. G02B 27/0068
(Continued)

FOREIGN PATENT DOCUMENTS

JP    2018-082318 A    5/2018
KR    10-1820456 B1    1/2018

OTHER PUBLICATIONS

Communication dated Jan. 28, 2022 issued by the European Patent Office in application No. 21186429.3.

*Primary Examiner* — Jade R Chwasz
(74) *Attorney, Agent, or Firm* — Sughrue Mion, PLLC

(57) ABSTRACT

A holographic display apparatus and a holographic display method are provided. The holographic display apparatus determines a representative depth from 3D image data; calculates a computer generated hologram (CGH) corresponding to the representative depth on the 3D image data; obtains the modulated CGH by modulating a phase of the CGH to increase an eye box; modulates a light according to the modulated CGH and generates a hologram image; and forms the generated hologram image at the representative depth.

20 Claims, 9 Drawing Sheets

(52) U.S. Cl.
CPC ........... *G02B 2027/0174* (2013.01); *G02B 2027/0178* (2013.01); *G03H 2001/0825* (2013.01); *G03H 2210/30* (2013.01)

(58) Field of Classification Search
USPC .......................................... 359/9
See application file for complete search history.

(56) References Cited

U.S. PATENT DOCUMENTS

| | | | |
|---|---|---|---|
| 2011/0157667 A1* | 6/2011 | Lacoste | G03H 1/0808 359/9 |
| 2015/0234351 A1 | 8/2015 | Alon-Braitbart et al. | |
| 2018/0024628 A1* | 1/2018 | Kim | G03H 1/2286 345/156 |
| 2018/0181065 A1* | 6/2018 | An | G03H 1/2286 |
| 2018/0220127 A1* | 8/2018 | Khan | H04N 13/395 |

\* cited by examiner

HOLOGRAPHIC DISPLAY APPARATUS AND OPERATING METHOD THEREOF

CROSS-REFERENCE TO RELATED APPLICATION

This application is based on and claims priority under 35 U.S.C. § 119 to Korean Patent Application No. 10-2020-0109566, filed on Aug. 28, 2020, in the Korean Intellectual Property Office, the disclosure of which is incorporated by reference herein in its entirety.

BACKGROUND

1. Field

The disclosure relates to a holographic display apparatus and an operating method thereof.

2. Description of Related Art

Methods such as glasses-type methods and non-glasses-type methods are widely used for realizing 3D images. Examples of glasses-type methods include deflected glasses-type methods and shutter glasses-type methods, and examples of non-glasses-type methods include lenticular methods and parallax barrier methods. When these methods are used, there is a limitation with regard to the number of viewpoints that may be implemented due to binocular parallax. Also, these methods make the viewers feel tired due to the difference between the depth perceived by the brain and the focus of the eyes.

On the other hand, holographic 3D image display methods are non-glasses-type methods. Holographic 3D image display methods, which provide full parallax and are capable of making the depth perceived by the brain consistent with the focus of the eyes, have been gradually commercialized. According to such a holographic display technique, when light is irradiated onto a hologram pattern having recorded thereon an interference pattern obtained by interference between object light reflected from an original object and reference light, the light is diffracted and an image of the original object is reproduced. When a currently commercialized holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to an input CGH signal, thereby generating a 3D image.

However, to implement a complete holographic display method, a spatial light modulator of very high resolution and a very large amount of data throughput is required. Recently, to alleviate the conditions of data throughput and resolution, a hologram method of providing a hologram image only in a viewing area corresponding to both eyes of an observer has been proposed. In this case, since it is not necessary to generate hologram images with respect to the other viewpoints other than the viewing area corresponding to both eyes of the observer, the data throughput may be greatly reduced, and the resolution condition of the spatial light modulator may be satisfied even with the currently commercialized display apparatus.

SUMMARY

Provided are a holographic display apparatus having an expanded eye box and an operating method thereof.

Provided are a holographic display apparatus providing a hologram image at a representative depth and an operating method thereof.

Additional aspects will be set forth in part in the description which follows and, in part, will be apparent from the description, or may be learned by practice of the example embodiments of the disclosure.

According to an aspect of the disclosure, the holographic display apparatus includes a processor configured to identify a representative depth from 3D image data, calculate a computer generated hologram (CGH) corresponding to the representative depth on the 3D image data, and expand an eye box by modulating a phase of the CGH to obtain a modulated CGH; a spatial light modulator configured to generate a hologram image by modulating light based on the modulated CGH; and a focus optical system configured to form the hologram image generated by the spatial light modulator at the representative depth.

The processor may modulate the CGH with a random phase less than or equal to a certain scattering angle.

In addition, the scattering angle may be less than or equal to a viewing angle.

In addition, the scattering angle may be less than or equal to 5 degrees.

The processor may calculate the CGH such that an object in the 3D image data, having a depth different from the representative depth before the calculation has the representative depth after the calculation.

The processor may correct the object based on binocular parallax.

The processor may change at least one of a size, a position, and a luminance of the object based on the binocular parallax.

The processor may analyze at least one of a depth map and a color map included in the 3D image data to determine the representative depth.

The processor may analyze saliency information from the color map to determine the representative depth.

The processor may determine the representative depth with respect to each of a plurality of frames included in the 3D image data The processor may control at least one of the spatial light modulator and the focus optical system such that each of the plurality of frames is displayed at the representative depth.

The holographic display apparatus may be a wearable apparatus.

The holographic display apparatus may further include an image converging member configured to change at least one of a first light path of light corresponding to the hologram image and a second light path of external light corresponding to an external image to converge the hologram image and the external image corresponding to one region.

According to another aspect of the disclosure, a holographic display method includes identifying a representative depth from 3D image data; calculating a computer generated hologram (CGH) corresponding to the representative depth on the 3D image data; expanding an eye box by modulating a phase of the CGH to obtain a modulated CGH; generating a hologram image by modulating light based on the modulated CGH; and forming the generated hologram image at the representative depth.

The modulating the phase of the CGH may include modulating the CGH with a random phase less than or equal to a certain scattering angle.

In addition, the scattering angle may be less than or equal to a viewing angle.

In addition, the scattering angle may be less than or equal to 5 degrees.

The calculating of the CGH may include obtaining the CGH such that an object in the 3D image data having depth information different from the representative depth before the calculation has the representative depth after the calculation.

The holographic display method may further include correcting the object based on binocular parallax.

The correcting may include changing at least one of a size, a position, and a luminance of the object based on the binocular parallax.

The determining of the representative depth may include determining the representative depth by analyzing at least one of a depth map and a color map included in the 3D image data.

The determining of the representative depth may include determining the representative depth by analyzing saliency information from the color map.

The determining of the representative depth may include determining the representative depth with respect to each of a plurality of frames included in the 3D image data.

The holographic display method may converge the hologram image and an external image corresponding to external light to one region by changing at least one of a first light path of light corresponding to the hologram image and a second light path of the external light corresponding to the external image.

According to another aspect of the disclosure, a holographic display apparatus includes a memory storing one or more instruction; and a processor configured to execute the one or more instructions to: identify a representative depth from 3D image data, obtain a computer generated hologram (CGH) corresponding to the representative depth on the 3D image data, modulate a phase of the CGH to obtain a modulated CGH, and control a spatial light modulator to generate a hologram image based on the modulated CGH.

According to another aspect of the disclosure, a holographic display method includes identifying a representative depth from 3D image data; obtaining a computer generated hologram (CGH) corresponding to the representative depth on the 3D image data; modulating a phase of the CGH to obtain a modulated CGH, and controlling a spatial light modulator to generate a hologram image based on the modulated CGH.

According to another aspect of the disclosure, a holographic display apparatus includes a memory storing one or more instruction; and a processor configured to execute the one or more instructions to: obtain a computer generated hologram (CGH) corresponding to a 3D image data, modulate the CGH with a random phase less than or equal to a certain scattering angle, and control a spatial light modulator to generate a hologram image based on the modulated CGH.

According to another aspect of the disclosure, a holographic display method includes obtaining a computer generated hologram (CGH) corresponding to a 3D image data, modulating the CGH with a random phase less than or equal to a certain scattering angle, and controlling a spatial light modulator to generate a hologram image based on the modulated CGH.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
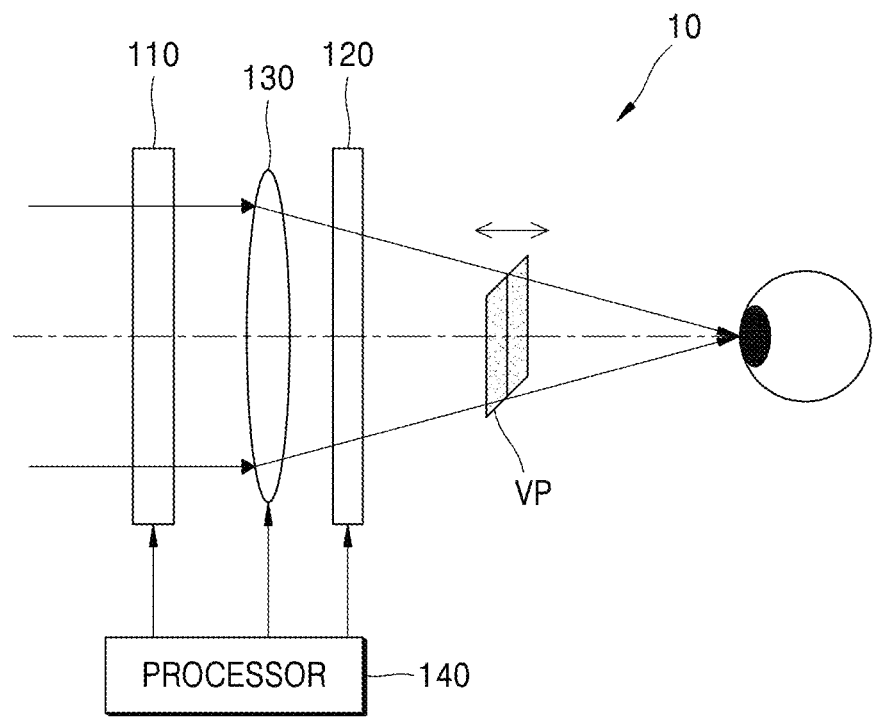
FIG. 1 is a diagram illustrating a holographic display apparatus according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. In the drawings, the same reference numerals represent the same elements, and a size of each element may be exaggerated for clarity and convenience of description. Example embodiments described below are merely examples and various modifications may be made therein.

As used herein, the term "on" or "above" an element may be understood to mean that the element may be directly on another element or be on another element not in contact with the other element.

As used herein, the singular expressions are intended to include plural forms as well, unless the context clearly dictates otherwise. It will be understood that when an element is referred to as "including" another element, the element may further include other elements unless mentioned otherwise.

The term "the" and demonstratives similar thereto may be understood to include both singular and plural forms.

Operations of a method may be performed in an appropriate order unless explicitly stated or contradicted to the order of the operations. It is not necessarily limited to the order of description of the operations. In addition, all terms indicating examples (e.g., etc.) are only for the purpose of describing technical ideas in detail, and thus the scope of the disclosure is not limited by these terms unless limited by the claims.

Figure 2:
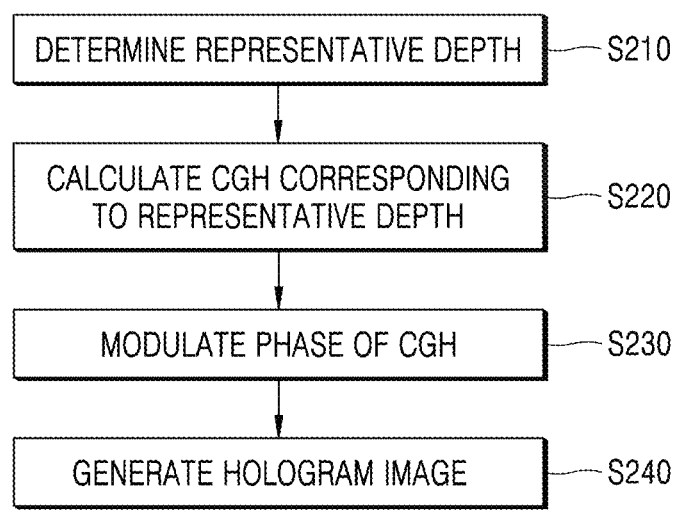
FIG. 2 is a flowchart illustrating an operating method of a holographic display apparatus.

FIG. 1 is a diagram illustrating a holographic display apparatus 10 according to an example embodiment. FIG. 2 is a flowchart illustrating an operating method of the holographic display apparatus 10.

The holographic display apparatus 10 may include a light emitter 110 that provides coherent light, a spatial light modulator 120 that diffracts the light from the light emitter 110 to generate a hologram image, a focus optical system 130 that forms the hologram image on a predetermined space, and a processor 140 that calculates a computer generated hologram (CGH) from 3D image data and provides the CGH to the spatial light modulator 120.

The light emitter 110 may include a light source that provides the coherent light and a light guide plate that changes and outputs light incident from the light source to light having a different dimension.

The light source may provide the coherent light. The light source may include a laser diode. However, when the light source has a certain degree of spatial coherence, because the light may be diffracted and modulated by the spatial light modulator 120 to have coherence, other light sources that may emit light having a certain degree of spatial coherence may also be used.

The light guide plate proceeds the light incident from the light source and outputs the light of the different dimension. For example, when the incident light is spot light, the light guide plate may convert and output the spot light into line light. Alternatively, when the incident light is the line light, the light guide plate may convert and output the line light into surface light.

According to an example embodiment, a beam expander may be further provided between the light source and the light guide plate. The beam expander may primarily expand the light by collimating point light from the light source. The beam expander may include, for example, a collimating lens.

The spatial light modulator 120 diffracts the incident light to generate the hologram image. A hologram method uses the principle that an object wave is reproduced when a reference wave is irradiated on a hologram on which interference fringes of the object wave and the reference wave are recorded. Recently, a CGH has been used to form such interference fringes.

The display device 120 may include, for example, a liquid crystal on silicon (LCoS) device, a liquid crystal display (LCD) device, an organic light emitting diode (OLED) display device, and a digital micromirror device (DMD), and may include next-generation display apparatuses such as a micro LED, a quantum dot (QD) LED, etc.

The focus optical system 130 may display a hologram image according to depth information included in the hologram image. That is, the focus optical system 130 is provided for expressing multiple depths, and visual fatigue may be reduced by expressing the multiple depths. The focus optical system 130 displays the hologram image generated by the spatial light modulator 120 on a virtual reference plane VP, and has a configuration in which the focus position of the focus optical system 130 varies such that a position of the virtual reference plane VP, that is, a representative depth, varies. The virtual reference plane VP may be predetermined.

The variable focus optical system 130 may include one or more lenses. At least one lens may be configured to have a variable curvature or move in an optical axis direction, and accordingly, the focus position may vary and the position of the virtual reference plane VP on which the hologram image is displayed may vary.

The processor 140 determines the representative depth at which the hologram image is to be displayed from the 3D image data, and calculates the CGH corresponding to the representative depth based on the 3D image data. In addition, the processor 140 may expand an eye box by modulating a phase of the CGH.

In general, when the CGH is input to the spatial light modulator 120, the spatial light modulator 120 modulates the incident light according to the CGH to generate the hologram image. For a CGH operation, a hologram value with respect to each position of a hologram plane is calculated. To this end, a fast Fourier transform (FFT) operation is performed on each layer such that all depth planes on the space are focused. Because the CGH operation needs to be performed with respect to all layers, the amount of computations is very large.

The holographic display apparatus 10 of the example embodiment applies the proposed representative depth extraction method to a holographic display. That is, because the holographic display apparatus 10 performs the FFT operation only on a layer corresponding to the representative depth, the amount of calculations may be significantly reduced.

Accordingly, the processor 140 determines the representative depth from the 3D image data to simplify processing of the 3D image data. The processor 140 determines the representative depth by analyzing color information and depth information included in the 3D image data, and a method of determining the representative depth will be described in detail later in FIG. 6. The processor 140 may determine the representative depth for each frame of a 3D image.

The processor 140 may calculate the CGH corresponding to the representative depth. That is, the processor 140 may obtain one CGH image layer. The processor 140 may calculate the CGH having the representative depth for each frame of the 3D image data. Thus, the spatial light modulator 120 may generate the hologram image according to the CGH, and the focus optical system 130 may display the generated hologram image on the virtual reference plane VP positioned at the representative depth. The focus optical system 130 adjusts the focus such that the virtual reference plane VP is formed at the representative depth, but is not limited thereto. The virtual reference plane VP corresponding to the representative depth may be adjusted by changing the position of the spatial light modulator 120.

Meanwhile, the processor 140 may widen the eye box by further modulating the phase of the CGH corresponding to the representative depth. The eye box is a region that is accessible by the pupil of the eye at an arbitrary position of the pupil of the eye, and the length of the eye box may be less than or equal to 5 mm.

As described above, while the holographic display apparatus 10 using parallel light and the focus optical system 130 has an advantage of reducing the amount of computations, when the parallel light and the focus optical system 130 are used, the eye box for viewing hologram images may be narrow. The processor 140 according to an example embodiment may expand the eye box by further modulating the phase of the calculated CGH. As such, the problem of a narrow eye box may be solved.

The processor 140 may perform random phase modulation on the CGH. The random phase modulation may produce the effect of spreading light reaching the surface of a CGH image layer in various directions by expressing the surface of the CGH image layer finely and roughly. A random phase may also increase the accommodation effect, which is one of main characteristics of the hologram. However, the random phase may cause speckle noise and may degrade the spatial correlation of the hologram itself.

Accordingly, the processor 140 according to an example embodiment may modulate the CGH with a random phase less than or equal to a scattering angle. The scattering angle may be less than or equal to a viewing angle or less than or equal to 5 degrees. The scattering angle may be a certain angle that is predetermined.

The spatial light modulator 120 may generate the hologram image according to the modulated CGH, and the focus optical system 130 may display the hologram image by forming the hologram image generated on the virtual reference plane VP corresponding to the representative depth.

As described above, by calculating the CGH corresponding to the representative depth from the 3D image data, the amount of computations of the processor 140 may be effectively reduced. In addition, by performing random phase modulation of a small scattering angle on the CGH corresponding to the representative depth, the processor 140 may expand the eye box without deteriorating the quality of the hologram image.

When random phase modulation is performed on the CGH without limiting the scattering angle, the direction of the scattered light varies for each pixel of the spatial light modulator 120. Thus, part of the scattered light may not enter the pupil of an observer, which makes a partial region of the hologram image appear dark.

Figure 3A:
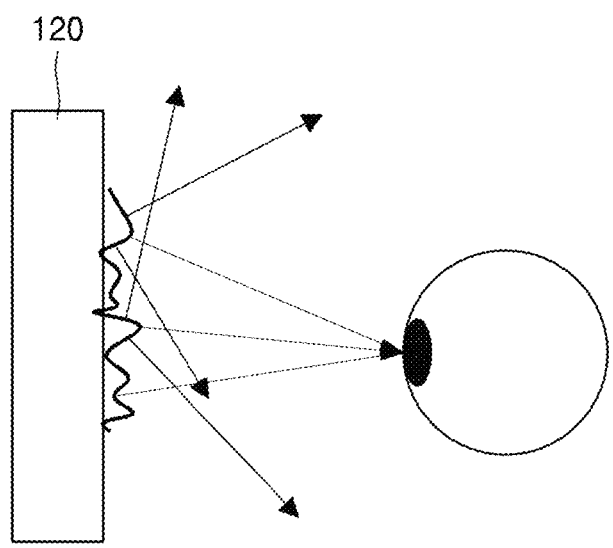
FIG. 3A is a reference diagram illustrating a random phase modulated computer generated hologram (CGH)
Figure 3B:
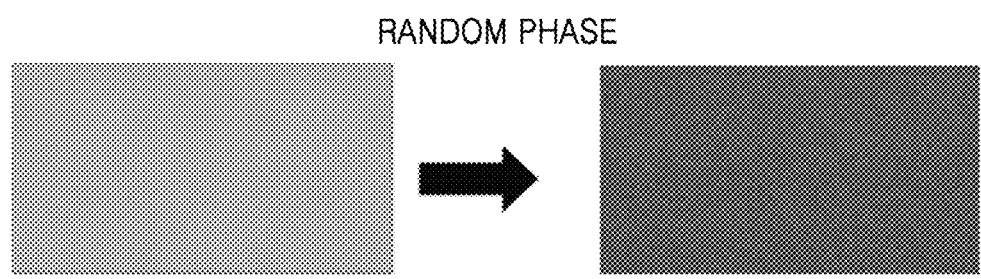
FIG. 3B is a reference diagram illustrating a hologram image to which a random phase is applied.

FIGS. 3A and 3B are comparative examples and are diagrams illustrating a hologram image generated using a random phase without any limitation of a scattering angle.

Referring to FIG. 3A, to widen the depth of field of view with respect to the CGH, the CGH is modulated with the random phase without any limitation of the scattering angle, and the spatial light modulator 120 diffracts light according to the modulated CGH. The light emitted from the spatial light modulator 120 may be randomly scattered according to the random phase. Part of the randomly scattered light may not pass through the pupil. Thus, black dots may occur in the hologram image as shown in FIG. 3B. In addition, because the light is scattered randomly, a degree of blurring of the hologram image may be irregular.

Figure 4:
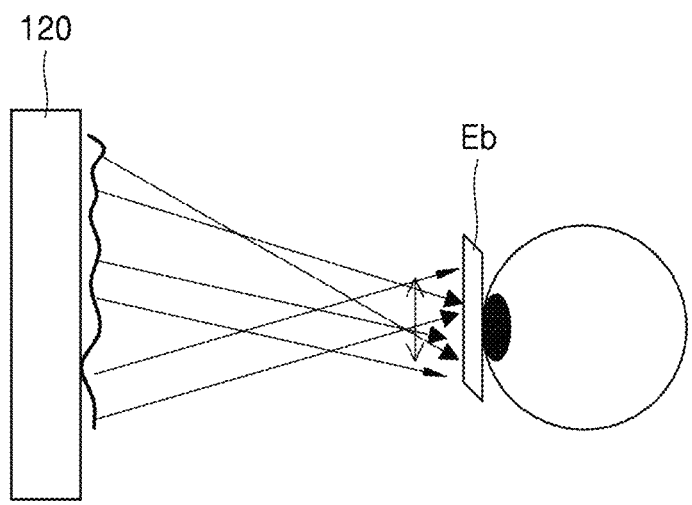
FIG. 4 is a reference diagram illustrating a hologram image modulated with a random phase less than or equal to a certain scattering angle according to an example embodiment.

FIG. 4 is a reference diagram illustrating a hologram image modulated with a random phase less than or equal to a certain scattering angle according to an example embodiment. When the CGH is modulated with the random phase of the certain scattering angle, as shown in FIG. 4, light modulated by the spatial light modulator 120 may be scattered less than or equal to the certain scattering angle. Thus, even when the light is scattered, most of the light converges within the viewing range of an observer, which expands an eye box Eb. The scattering angle of the random phase may be within a viewing angle range or may be less than or equal to 5 degrees.

Meanwhile, even when the CGH is modulated with a random phase of a small scattering angle, when a hologram image is formed with the CGH having a plurality of pieces of depth information, an object displayed at the focal length has the effect of expanding the eye box Eb, but the image quality of an object that is not displayed at the focal length deteriorates.

Figure 5:
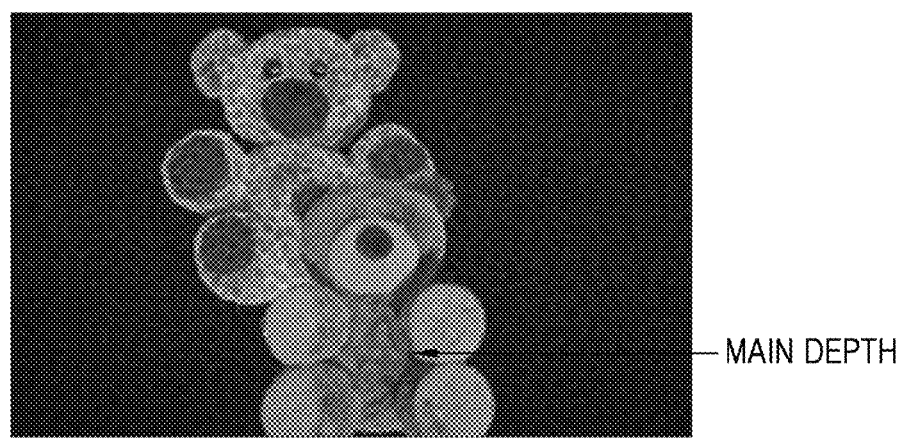
FIG. 5 is a diagram illustrating a hologram image in which a random phase is applied to a CGH having a plurality of pieces of depth information.

FIG. 5 is a diagram illustrating a hologram image in which a random phase is applied to a CGH having a plurality of pieces of depth information. As shown in FIG. 5, it may be seen that the image quality of a first object 510 displayed at the focal length is clear, while the image quality of a second object 520 that is not displayed at the focal length degrades.

Accordingly, a holographic display apparatus according to an example embodiment calculates the CGH corresponding to a single depth when calculating the CGH from 3D image data. The above-described single depth may be a representative depth that is highly likely to be noticed by an observer.

Figure 6:
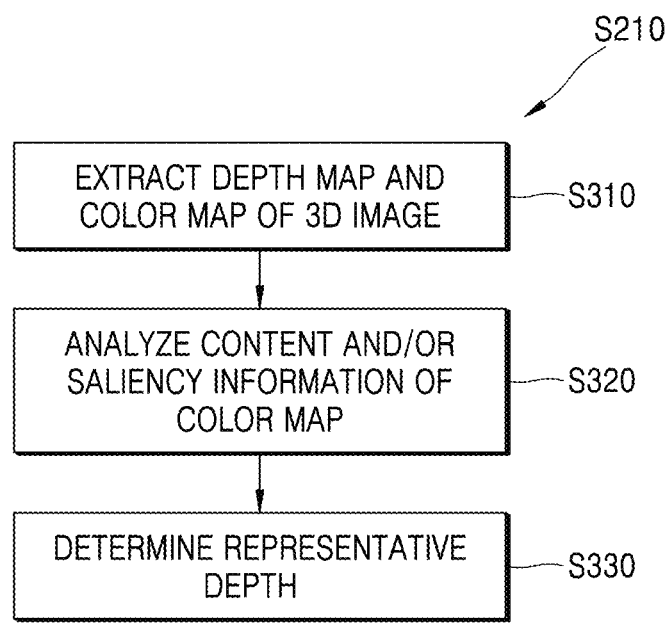
FIG. 6 is a flowchart illustrating a method of determining a representative depth, according to an example embodiment.
Figure 7A:
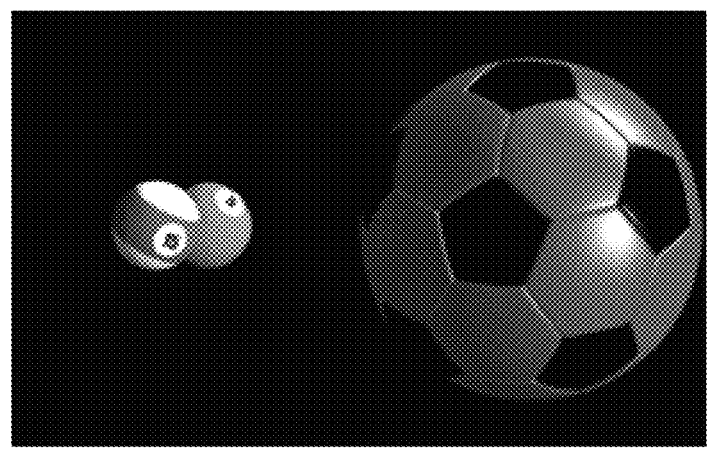
FIGS. 7A and 7B illustrate an example in which a color map and a depth map are extracted and a representative depth is determined according to the flowchart of FIG. 6.
Figure 7B:
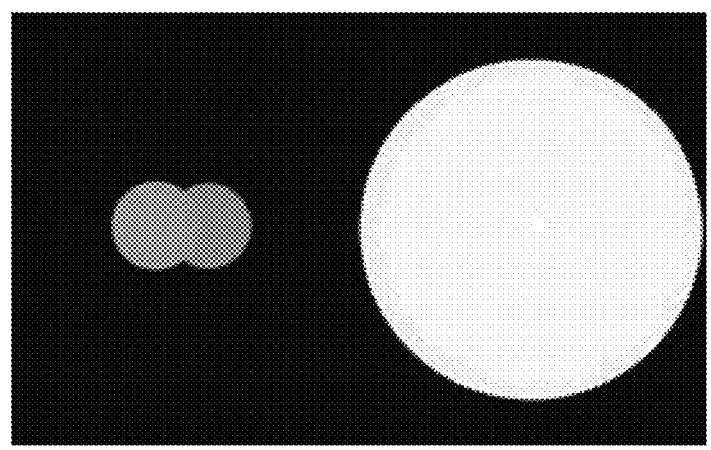

FIG. 6 is a flowchart illustrating a method of determining a representative depth, according to an example embodiment. FIGS. 7A and 7B illustrate an example in which a color map and a depth map are extracted and a representative depth is determined according to the flowchart of FIG. 6.

To determine the representative depth, the processor 140 may extract the depth map and the color map from 3D image data (S310). The color map may be a color image as shown in FIG. 7A.

The processor 140 may perform content analysis and/or saliency information analysis on the color map (S320). The saliency information analysis may be performed to determine a region on which an observer is likely to keep an eye, that is, a region with high visual concentration. Brightness, color, outline, object size, etc. may be considered to determine the region with high visual concentration. For example, a region having a large difference in brightness or color compared to the surroundings, a region having a strong outline characteristic, and a region having a large size of an object may be the region with high visual concentration. A depth value corresponding to this region may be determined as the representative depth (S330). Alternatively, a position with high visual concentration may be determined according to content included in an image.

FIG. 7A illustrates a color image and FIG. 7B illustrates the depth map corresponding to the color image of FIG. 7A. FIG. 7B illustrates a case in which a soccer ball having a size larger than that of a baseball in the color image of FIG. 7A is determined as the region with high visual concentration, and the depth value corresponding to this region may be determined as the representative depth.

In addition, the processor 140 may determine the representative depth from the depth map considering a zone of comfort (ZOC), quantize depth information included in the depth map and determine the representative depth based on the depth information.

Meanwhile, when an image is displayed at the representative depth, a difference in depth sense between a plurality of objects may be reduced. A holographic display apparatus according to an example embodiment may use a binocular parallax method to display a 3D image. As described above, to expand an eye box of a hologram image and maintain the image quality, the hologram image is displayed at one representative depth. The holographic display apparatus according to an example embodiment may implement a difference in depth sense between objects by applying a binocular parallax method instead of displaying a plurality of objects included in 3D image data at one representative depth.

Figure 8:
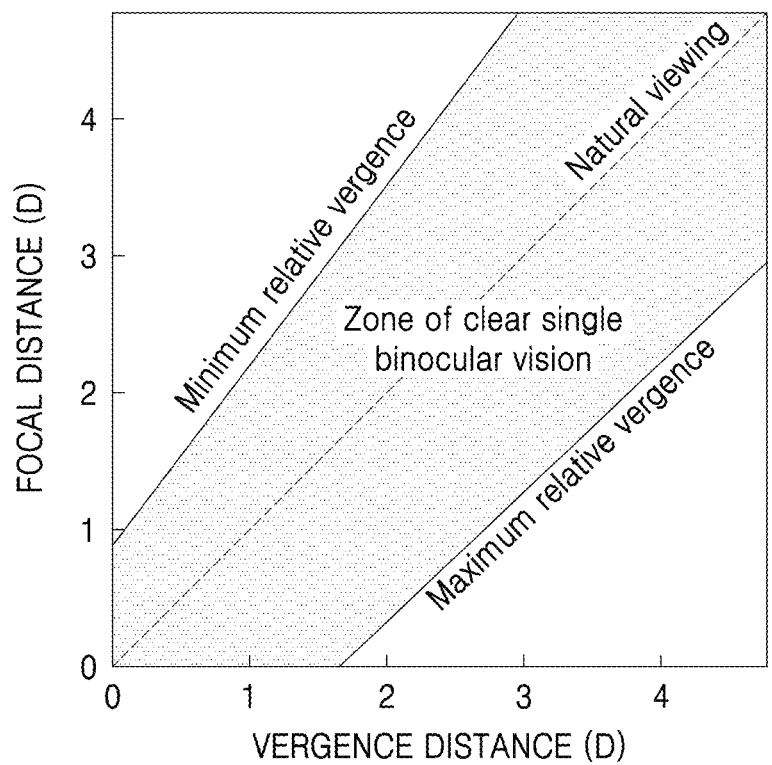
FIG. 8 illustrates a graph analyzing a zone of comfort (ZOO)

FIG. 8 illustrates a graph analyzing a zone of comfort (ZOC). The horizontal axis of the graph represents a vergence distance, and the vertical axis represents a focal distance.

Vergence means focusing the visual axis of both eyes on an object to be viewed. When recognizing a hologram image by binocular parallax, the gaze of both eyes verges toward the object to be viewed. Vergence occurs to perceive a single image when the binocular parallax exceeds a parallax fusion limit and a double image is experienced. When the gaze moves from a distant place to a near place, convergence occurs. To the contrary, divergence occurs when the gaze moves from the near place to the distant place. In synchronization with this action, accommodation takes place. When the focal distance coincide with the vergence distance, a clear image is recognized. Due to the characteristics of human visual perception, an image in a predetermined range in which the focal distance does not completely coincide with the vergence distance may be recognized as the clear image. In the graph, a hatched region between two straight lines displayed as a minimum relative vergence and a maximum relative vergence is illustrated as a region in which a clear single image is recognized.

Figure 9:
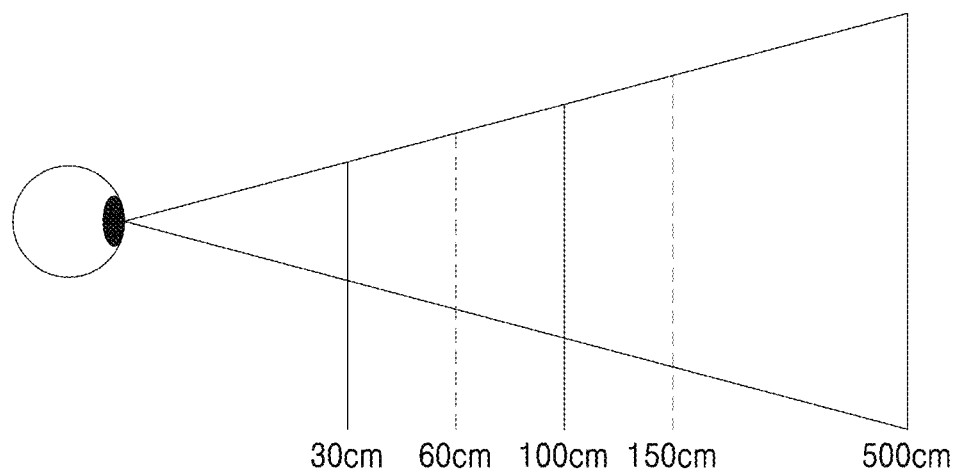
FIG. 9 is a conceptual diagram illustrating depth information that may be displayed at a representative depth considering a ZOO.

FIG. 9 is a conceptual diagram illustrating depth information that may be displayed at a representative depth considering a ZOC.

For example, considering the ZOC, when the representative depth is about 60 cm, an object having depth information of about 30 cm to 10 cm may be displayed at the representative depth, and a sense of depth may be implemented by applying the binocular parallax. Alternatively, when the representative depth is about 150 cm, an object having depth information of about 10 cm to 500 cm may be displayed at the representative depth, and a sense of depth may be implemented by applying the binocular parallax without a visual fatigue.

A holographic display apparatus according to an example embodiment may perform a CGH operation corresponding to the representative depth on an object that is difficult to display a sense of depth with the binocular parallax, for example, an object having depth information beyond the ZOC but may not apply random phase modulation. This is because an object displayed on a region where the visual concentration of a user deteriorates may have a narrow viewing angle.

Alternatively, the processor 140 may process the object that is difficult to display the sense of depth with the binocular parallax based on a boundary depth that may be implemented with the binocular parallax. For example, when the representative depth is about 60 cm and the depth information of the object is about 120 cm, the processor 140 may apply the binocular parallax to the object by changing the depth information of the object to 10 cm.

Figure 10:
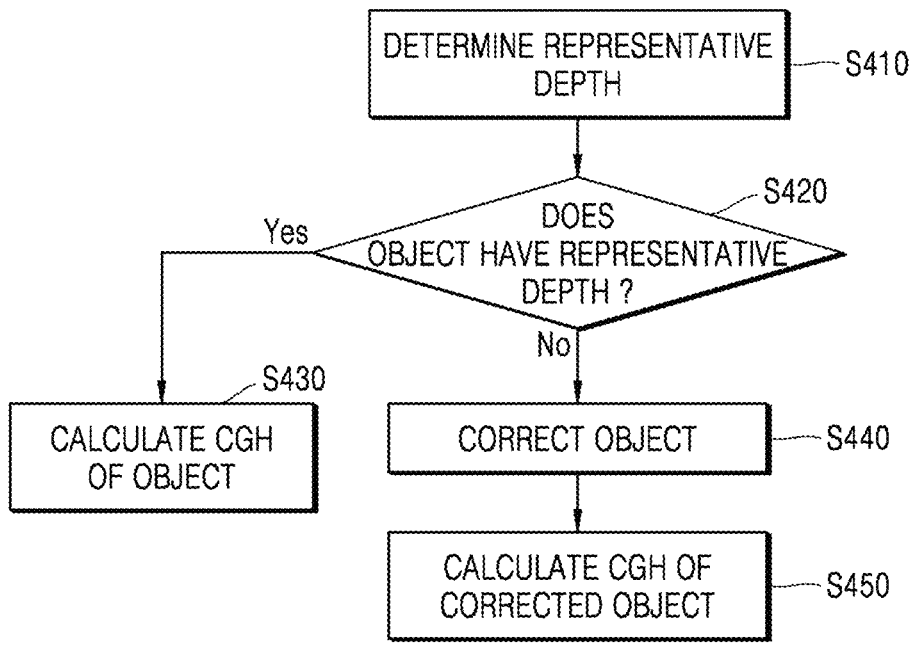
FIG. 10 is a flowchart illustrating an object processing method to use binocular parallax according to an example embodiment.

FIG. 10 is a flowchart illustrating an object processing method to use the binocular parallax according to an example embodiment.

Referring to FIG. 10, the processor 140 may determine a representative depth from 3D image data (S410). The method of determining the representative depth is described above, and thus a detailed description thereof will be omitted.

The processor 140 determines whether an object included in a frame is an object having the representative depth (S420). Because 3D image data includes a depth map including depth information for each object, the processor 140 may determine whether the object has the representative depth by comparing the representative depth with depth information corresponding to the object.

If it is determined that the object has the representative depth (S420-Yes), the processor 140 may perform a CGH operation on the object (S430). The processor 140 may calculate the object with a CGH corresponding to the representative depth.

However, if it is determined that the object does not have the representative depth (S420-No), the processor 140 may correct the object based on the binocular parallax (S440). For example, the processor 140 may correct at least one of the size, position, and luminance of the object. For example, when the depth information of the object is greater than the representative depth, the processor 140 may reduce the size of the object, change the position of the object such that a distance between the object and the object having the representative depth decreases or reduce the luminance of the object. Alternatively, when the depth information of the object is less than the representative depth, the processor 140 may increase the size of the object, change the position of the object such that the distance between the object and the object having the representative depth increases or increase the luminance of the object.

In addition, the processor 140 may calculate the corrected object with the CGH corresponding to the representative depth (S450). Thereafter, the processor 140 may modulate a phase of the CGH to expand an eye box, and the spatial light modulator 120 may generate a hologram image according to the modulated CGH.

Figure 11:
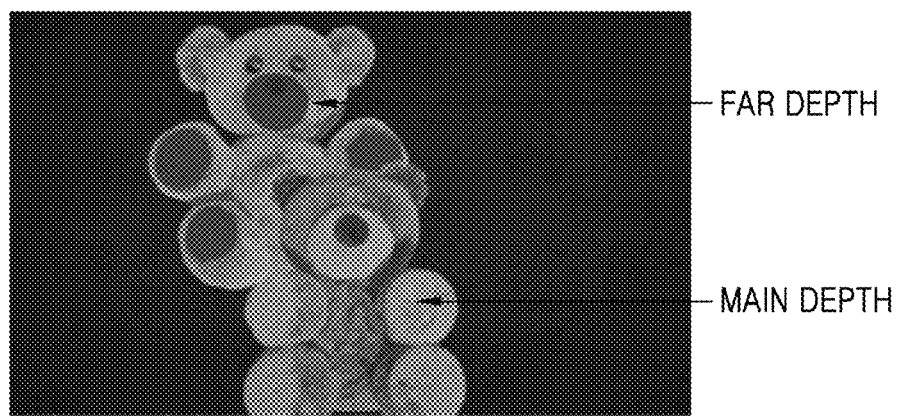
FIG. 11 is a diagram illustrating a left eye hologram image generated by applying binocular parallax according to an example embodiment.

FIG. 11 is a diagram illustrating a left eye hologram image generated by applying binocular parallax according to an example embodiment. As shown in FIG. 11, it may be seen that the image quality of a first object at a representative depth is clear. A second object is corrected using the binocular parallax and calculated with a CGH corresponding to the representative depth. It may be seen that the image quality of the second object is also clear.

A method of displaying a hologram image in a frame of 3D image data is described. Determination of the representative depth, correction of an object that does not have the representative depth, a CGH calculation, and generation of the hologram image may be performed in units of frames. The focus optical system 130 forms the hologram image such that the hologram image is displayed at the representative depth, but is not limited thereto. The spatial light modulator 120 may move to form the hologram image at the representative depth.

Figure 12:
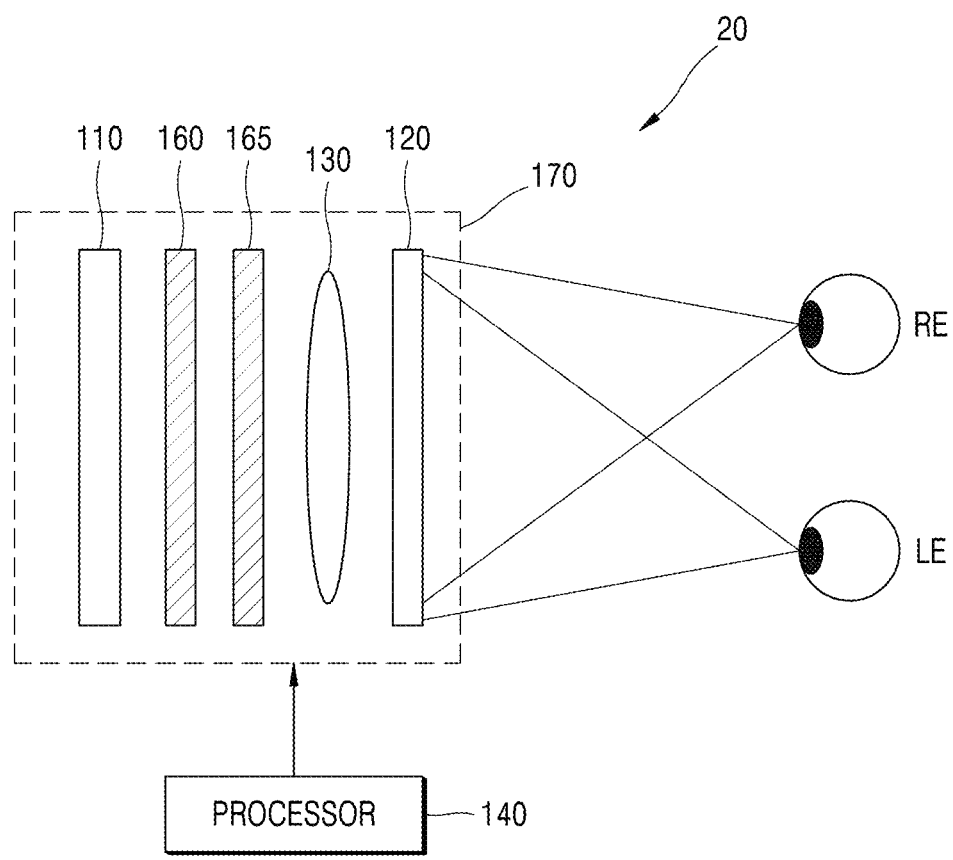
FIG. 12 is a diagram illustrating a holographic display apparatus according to another example embodiment.

FIG. 12 is a diagram illustrating a holographic display apparatus 20 according to another example embodiment. Comparing FIGS. 1 to 12, the holographic display apparatus 20 of FIG. 12 may further include first and second beam steerers 160 and 165 two-dimensionally controlling the traveling direction of light emitted from the light emitter 110. The first and second beam steerers 160 and 165 may adjust the position of light output according to the position of the pupil of a viewer. For example, the first beam steerer 160 may adjust the horizontal position of the light, and the second beam steerer 165 may adjust the vertical position of the light. The first and second beam steerers 160 and 165 may be implemented as, for example, a liquid crystal layer or an electrowetting device.

In FIG. 12, the position of the focus optical system 130 is between the second beam steerer 165 and the spatial light modulator 120, but is not limited thereto. The focus optical system 130 may be located, for example, in front of the spatial light modulator 120.

Although not shown in the drawing, the holographic display apparatus 20 may further include an eye tracking sensor that recognizes the position of the viewer, and according to the position sensed by the eye tracking sensor, the processor 140 may control the first and second beam steerers 160 and 165. The eye tracking sensor may include an infrared camera, a visible light camera, or various other sensors.

The processor 140 may sequentially control the irradiation direction of the light such that a hologram image is formed in a left eye LE and a right eye RE of the viewer time-sequentially.

The holographic display apparatus 20 according to the example embodiment may provide hologram images of different viewpoints to the viewer's left eye LE and right eye RE by using a binocular hologram method. For example, the holographic display apparatus 20 may provide a left eye hologram image to a viewing zone of the viewer's left eye LE and provide a right eye hologram image of a different viewpoint from that of the left eye hologram image to a viewing zone of the viewer's right eye RE. The left eye hologram image and the right eye hologram image provided by the holographic display apparatus 20 may solely provide a three-dimensional effect to an observer, and have different viewpoints only from each other. The holographic display apparatus 20 may form the left eye hologram image and the right eye hologram image at positions in a predetermined space, that is, the viewing zones of the viewer's left eye LE and the viewer's right eye RE, respectively, and thus a sense of depth perceived by the brain and the focus of the eye are consistent and provide a full parallax. The reason why the holographic display apparatus 20 according to the example embodiment provides only binocular viewpoints is to reduce an amount of data processing by removing the remaining viewpoint information except for viewpoint information that may be recognized by the observer because the observer may recognize only two viewpoints with the left eye LE and the right eye RE. This is to reduce an amount of data processing by removing information of viewpoints other than the information. However, the holographic display apparatus according to various example embodiments may provide more viewpoints.

The position at which the hologram image is focused may be adjusted by the first and second beam steerers 160 and 165. In other words, the first and second beam steerers 160 and 165 may adjust a left eye position at which the left eye hologram image is focused and a right eye position at which the right eye hologram image is focused. A unique gap between each viewer's left eye and right eye may be sensed by an eye tracking sensor, and a change in the position of the left and right eyes due to a viewer's movement may be sensed. According to the sensed information, the first and second beam steerers 160 and 165 may control the traveling direction of light.

Any one of the first beam steerer 160 and the second beam steerer 165 may be a liquid crystal deflector that diffracts incident light to generate two pieces of light traveling at different angles. When any one of the first and second beam steerers 160 and 165 spatially separates the light toward the left eye and the right eye at the same time, the time-sequential driving of the light source 110 may not be required.

The light of which the direction is controlled by the first and second beam steerers 160 and 165 is incident on the spatial light modulator 120 through the focus optical system 130. The spatial light modulator 120 may form a hologram pattern having an interference fringe for modulating the incident light. The incident light is diffracted and modulated by a hologram pattern formed by the spatial light modulator 120, and thus, a hologram image may be generated at a position on a predetermined space.

The holographic display apparatus according to an example embodiment may be applied to, for example, a mobile phone. When the user views a screen of a mobile phone, the eye tracking device and the beam steerer may be used to track the movement of the user's eye and display a 3D image according to the position of the eye.

Figure 13:
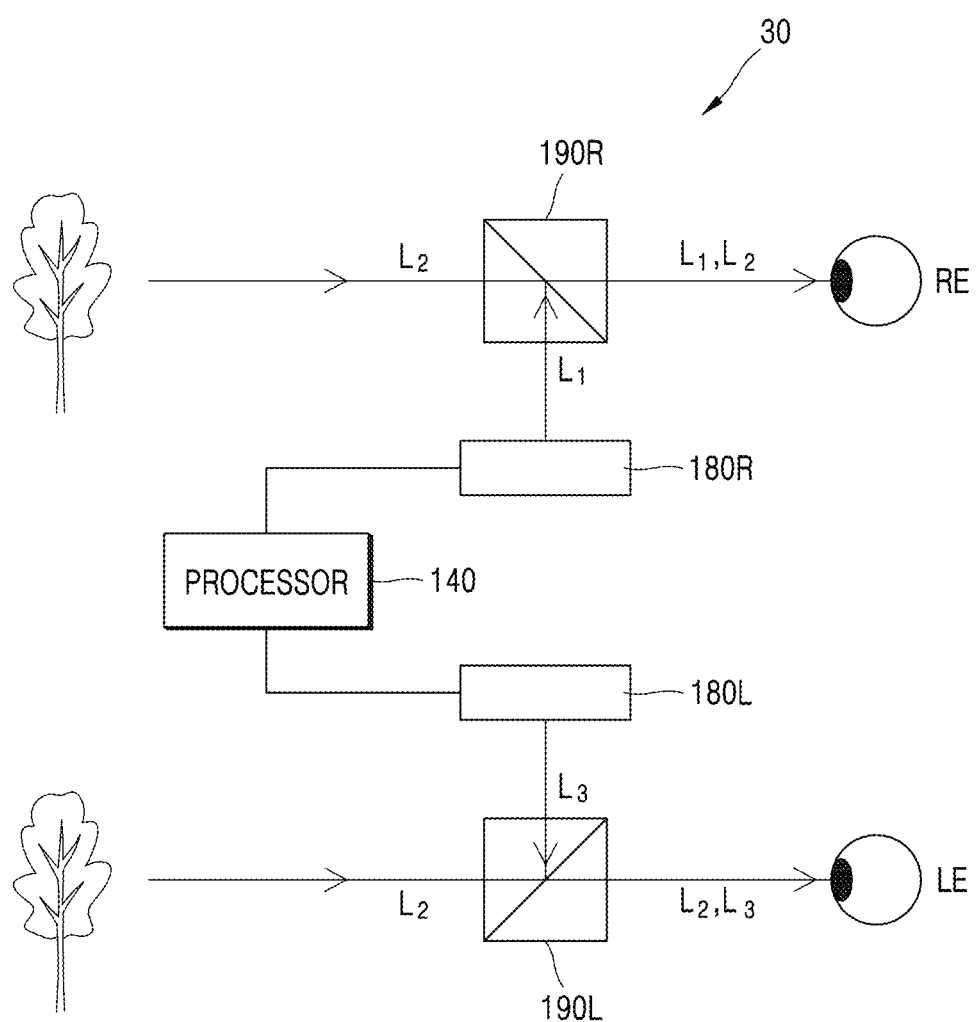
FIG. 13 is a diagram illustrating a holographic display apparatus usable as an augmented reality (AR) apparatus according to an example embodiment.

FIG. 13 is a diagram illustrating a holographic display apparatus 30 usable as an augmented reality (AR) apparatus according to an example embodiment. The holographic display apparatus 30 according to an example embodiment may have a configuration that provides an image to each eye. The images provided to both eyes may be the same, or may be images having parallax information.

The holographic display apparatus 30 may include a first display device 180R generating a right eye hologram image, a first image converging member 190R converging the right eye hologram image and a real environment into one region, a first display device 180L generating a left eye hologram image, a second image converging member 190L converging the left eye hologram image and the real environment into one region, and a processor 140 controlling the first and second display devices 180R and 180L to display a hologram image at a representative depth.

The first and second display devices 180R and 180L may respectively generate the right eye hologram image and the left eye hologram image under the control of the processor 140. The first and second display devices 180R and 180L may include a light emitter, a spatial light modulator, and a focus optical system as shown in FIG. 1, and thus, detailed descriptions thereof will be omitted.

The processor 140 may determine the representative depth from 3D image data such that the first and second display devices 180R and 180L may respectively generate the right eye hologram image and the left eye hologram image, and calculate a CGH corresponding to the representative depth from the 3D image data. In addition, to expand an eye box, the processor 140 may modulate a phase of the CGH to provide the modulated CGH to the first and second display devices 180R and 180L. The operation of the processor 140 is described above, and thus, a detailed description thereof will be omitted.

The first image converging member 190R may change at least one of a light path L1 of the right eye hologram image and a light path L2 of the real environment to converge the right eye hologram image with the real environment in one region. Here, one region may be the user's right eye RE. The image converging member 190R may transmit pieces of light along the plurality of light paths L1 and L2 to the user's pupil. The second image converging member 190L may change at least one of a light path L3 of the left eye hologram image and the light path L2 of the real environment to converge the left eye hologram image and the real environment in one region. Here, one region may be the user's left eye LE.

The first and second image converging members 190R and 190L may be transflective members having both light transmission and light reflection characteristics. As a specific example, the first and second image converging members 190R and 190L may include a beam splitter or a transflective film. FIG. 13 illustrates a case where the first and second image converging members 190R and 190L are beam splitters, but the configuration may be variously changed.

The hologram images transmitted by the pieces of light of the first and third light paths L1 and L1 may be images formed and provided in the AR apparatus. The hologram image is a 'display image' and may include virtual reality or virtual information. The real environment transmitted by the light of the second light path L2 may be an environment that the user faces through the AR apparatus. The real environment may include a foreground that the user faces and may include a predetermined background subject.

The holographic display apparatuses 10, 20, and 30 described above may be configured in the form of a wearable apparatus. All or part of the components of image display apparatuses may be configured in the form of a wearable apparatus.

For example, the holographic display apparatuses 10, 20, and 30 may be applied in the form of a head mounted display (HMD). Further, the present disclosure is not limited thereto, and may be applied as a glasses-type display or a goggle-type display.

The holographic display apparatuses 10, 20, and 30 described above may be applied to realize AR in that the image formed on a display element and the image of the real world may be viewed to the observer together.

AR may further increase the effect of reality by combining and showing virtual objects or information on the environment of the real world. For example, at the position of the observer, a spatial light modulator may generate additional information about the environment provided by the real world to provide the additional information to the observer. Such an AR display may be applied to a ubiquitous environment or an Internet of things (IoT) environment.

The image of the real world is not limited to a real environment, and may be, for example, an image formed by another imaging device. Accordingly, the above-described image display apparatus may be applied as a multi-image display apparatus that displays two images together.

The holographic display apparatuses 10, 20, and 30 above may operate in conjunction with or connected to other electronic devices such as a smart phone. For example, the processor 140 driving the holographic display apparatuses 10, 20, and 30 may be provided in a smart phone. In addition, the holographic display apparatuses 10, 20, and 30 described above may be provided in a smart phone.

The above-described holographic display apparatus and method thereof may expand an eye box while providing a hologram image at a representative depth.

The above-described holographic display apparatus and method thereof may provide a hologram image at a representative depth while providing an image with a sense of depth.

The holographic display apparatus described above is easily applied to a wearable device, and may be applied to, for example, a glasses-type AR display apparatus.

According to an example embodiment, the holographic display apparatuses 10, 20, and 30 may further include a memory. The memory may store an operating system (OS) for controlling the overall operations of the components of the holographic display apparatuses 10, 20, and 30 and commands or data related to the components of the holographic display apparatuses 10, 20, and 30.

According to an example embodiment, the processor 140 controls the overall operations of the holographic display apparatuses 10, 20, and 30. According to an embodiment, the processor 140 may include a central processing unit (CPU) or an application processor (AP). Also, the processor 140 may be implemented as at least one general processor, a digital signal processor, an application specific integrated circuit (ASIC), a system on chip (SoC), a microcomputer (MICOM), a driver IC, etc.

According to embodiments, the holographic display apparatuses 10, 20, and 30 may include a non-transitory computer readable medium having stored thereon one or more instructions to execute the operations performed by the holographic display apparatuses 10, 20, and 30. The non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
    a processor configured to identify a representative depth from 3D image data in a first direction, which is a depth direction, calculate a computer generated hologram (CGH) corresponding to the representative depth on the 3D image data, and expand an eye box in a second direction perpendicular to the first direction by modulating a phase of the CGH based on a reference scattering angle to obtain a modulated CGH;
    a spatial light modulator configured to generate a hologram image by modulating light based on the modulated CGH; and
    a focus optical system configured to form the hologram image generated by the spatial light modulator at the representative depth,
    wherein the processor is further configured to modulate the CGH with a random phase less than or equal to the reference scattering angle, and the reference scattering angle is less than or equal to a viewing angle.

2. The holographic display apparatus of claim 1, wherein the reference scattering angle is less than or equal to 5 degrees.

3. The holographic display apparatus of claim 1, wherein the processor is further configured to calculate the CGH such that an object in the 3D image data, having a depth different from the representative depth before the calculation has the representative depth after the calculation.

4. The holographic display apparatus of claim 3, wherein the processor is further configured to correct the object based on binocular parallax.

5. The holographic display apparatus of claim 4, wherein the processor is further configured to change at least one of a size, a position, and a luminance of the object based on the binocular parallax.

6. The holographic display apparatus of claim 1, wherein the processor is further configured to analyze at least one of a depth map and a color map included in the 3D image data to determine the representative depth.

7. The holographic display apparatus of claim 6, wherein the processor is further configured to analyze saliency information from the color map to determine the representative depth.

8. The holographic display apparatus of claim 1, wherein the processor is further configured to determine the representative depth with respect to each of a plurality of frames included in the 3D image data.

9. The holographic display apparatus of claim 8, wherein the processor is further configured to control at least one of the spatial light modulator and the focus optical system such that each of the plurality of frames is displayed at the representative depth.

10. The holographic display apparatus of claim 1, wherein the holographic display apparatus is a wearable apparatus.

11. The holographic display apparatus of claim 1, further comprising:
an image converging member configured to change at least one of a first light path of light corresponding to the hologram image and a second light path of external light corresponding to an external image to converge the hologram image and the external image corresponding to one region.

12. A holographic display method comprising:
identifying a representative depth in a first direction from 3D image data, the first direction being a depth direction;
calculating a computer generated hologram (CGH) corresponding to the representative depth on the 3D image data;
expanding an eye box in a second direction perpendicular to the first direction by modulating a phase of the CGH based on a reference scattering angle to obtain a modulated CGH;
generating a hologram image by modulating light based on the modulated CGH; and
forming the generated hologram image at the representative depth,
wherein the modulating the phase of the CGH comprises:
modulating the CGH with a random phase less than or equal to reference scattering angle,
wherein the reference scattering angle is less than or equal to a viewing angle.

13. The holographic display method of claim 12, wherein the reference scattering angle is less than or equal to 5 degrees.

14. The holographic display method of claim 12, wherein the calculating of the CGH comprises:
obtaining the CGH such that an object in the 3D image data having depth information different from the representative depth before the calculation has the representative depth after the calculation.

15. The holographic display method of claim 14, further comprising:
correcting the object based on binocular parallax.

16. The holographic display method of claim 15, wherein the correcting comprises:
changing at least one of a size, a position, and a luminance of the object based on the binocular parallax.

17. The holographic display method of claim 12, wherein the identifying of the representative depth comprises:
determining the representative depth by analyzing at least one of a depth map and a color map included in the 3D image data.

18. The holographic display method of claim 17, wherein the determining of the representative depth comprises:
determining the representative depth by analyzing saliency information from the color map.

19. The holographic display method of claim 17, wherein the determining of the representative depth comprises:
determining the representative depth with respect to each of a plurality of frames included in the 3D image data.

20. The holographic display method of claim 12, further comprising:
converging the hologram image and an external image corresponding to external light to one region by changing at least one of a first light path of light corresponding to the hologram image and a second light path of the external light corresponding to the external image.

* * * * *